United States Patent [19]

Meyers

[11] Patent Number: 5,286,502
[45] Date of Patent: Feb. 15, 1994

[54] USE OF EDIBLE FILM TO PROLONG CHEWING GUM SHELF LIFE

[75] Inventor: Marc A. Meyers, Naperville, Ill.

[73] Assignee: Wm. Wrigley Jr. Company, Chicago, Ill.

[21] Appl. No.: 871,962

[22] Filed: Apr. 21, 1992

[51] Int. Cl.$^5$ .............................................. A23G 3/30
[52] U.S. Cl. .................................... 426/5; 426/138; 426/297
[58] Field of Search ..................... 426/5, 125, 138, 297

[56] References Cited

U.S. PATENT DOCUMENTS

| | | | |
|---|---|---|---|
| 4,105,801 | 8/1978 | Dogliotti | 426/99 |
| 4,117,173 | 9/1978 | Schiwek et al. | 426/548 |
| 4,127,677 | 11/1978 | Fronczowski et al. | 426/5 |
| 4,146,653 | 3/1979 | Mader et al. | 427/3 |
| 4,224,219 | 9/1980 | Van Blanton et al. | 260/112 G |
| 4,317,838 | 3/1982 | Cherukuri et al. | 426/5 |
| 4,323,588 | 4/1982 | Vink et al. | 426/564 |
| 4,359,531 | 11/1982 | Bucke et al. | 435/97 |
| 4,423,086 | 12/1983 | Devos et al. | 427/3 |
| 4,567,053 | 1/1986 | Lindley | 426/538 |
| 4,568,560 | 2/1986 | Schobel | 427/3 |
| 4,587,119 | 5/1986 | Bucke et al. | 424/48 |
| 4,661,359 | 4/1987 | Seaborne | 426/138 |
| 4,681,766 | 7/1987 | Huzinec et al. | 426/5 |
| 4,693,974 | 9/1987 | Schwengers et al. | 435/97 |
| 4,777,046 | 10/1988 | Iwakura et al. | 424/435 |
| 4,786,511 | 11/1988 | Huzinec et al. | 426/5 |
| 4,792,453 | 12/1988 | Reed et al. | 426/5 |
| 4,802,924 | 2/1989 | Woznicki et al. | 427/3 |
| 4,810,534 | 3/1989 | Seaborne et al. | 427/384 |
| 4,822,622 | 4/1989 | Dokuzovic et al. | 426/5 |
| 4,824,680 | 4/1989 | Bernatz et al. | 426/5 |
| 4,828,845 | 5/1989 | Zamudio-Tena et al. | 426/5 |
| 4,915,971 | 4/1990 | Fennema et al. | 426/138 |
| 4,931,294 | 6/1990 | Yatka et al. | 426/3 |
| 4,961,935 | 10/1990 | Cherukuri et al. | 426/3 |
| 4,976,972 | 12/1990 | Patel et al. | 426/3 |
| 5,043,260 | 9/1991 | Raymond et al. | 53/370.8 |
| 5,089,307 | 2/1992 | Ninomiya et al. | 428/35.2 |
| 5,130,150 | 7/1992 | Averbach | 426/99 |
| 5,130,151 | 7/1992 | Averbach | 426/99 |

FOREIGN PATENT DOCUMENTS

| | | | |
|---|---|---|---|
| 24596/88 | 6/1989 | Australia | A23G 3/30 |
| 0273000 | 6/1988 | European Pat. Off. | A23L 1/236 |
| 0298768 | 1/1989 | European Pat. Off. | A61K 9/28 |
| 0328849 | 8/1989 | European Pat. Off. | A23G 3/30 |
| 3043914 | 6/1981 | Fed. Rep. of Germany | C09K 3/00 |
| 86/00501 | 1/1986 | PCT Int'l Appl. | A23L 1/00 |
| 87/03453 | 6/1987 | PCT Int'l Appl. | A23L 1/00 |
| 87/07902 | 12/1987 | PCT Int'l Appl. | C08L 1/00 |
| WO89/03170 | 4/1989 | PCT Int'l Appl. | |
| 89/03170 | 4/1989 | PCT Int'l Appl. | |
| WO90/06061 | 6/1990 | PCT Int'l Appl. | A23G 3/30 |
| 90/07864 | 7/1990 | PCT Int'l Appl. | |
| 90/13994 | 11/1990 | PCT Int'l Appl. | |
| 91/03147 | 3/1991 | PCT Int'l Appl. | |

OTHER PUBLICATIONS

U.S. patent application Ser. No. 07/855,251, filed Mar. 23, 1992, by Reed et al.
U.S. patent application Ser. No. 07/857,577, filed Mar. 26, 1992, by Reed et al.
Brochure: "Palatinit Infopac", Sussungsmittel GmbH (1984).
Brochure: "Methods of Application 3.6.0.1", date of publication unknown.

*Primary Examiner*—Jeanette Hunter
*Attorney, Agent, or Firm*—Willian Brinks Hofer Gilson & Lione

[57] ABSTRACT

A method of prolonging the shelf life of stick chewing gum, and a shelf-stable chewing gum prepared according to the method, are provided. Chewing gum sheet is coated on both sides with an aqueous solution of an edible film forming agent which, when partially dried, serves as an adhesive. A layer of wax is then applied to each of the layers of edible film forming agent. Stick chewing gum prepared according to the method of the invention does not absorb or lose moisture as fast as conventional, uncoated chewing gum sticks.

28 Claims, 6 Drawing Sheets

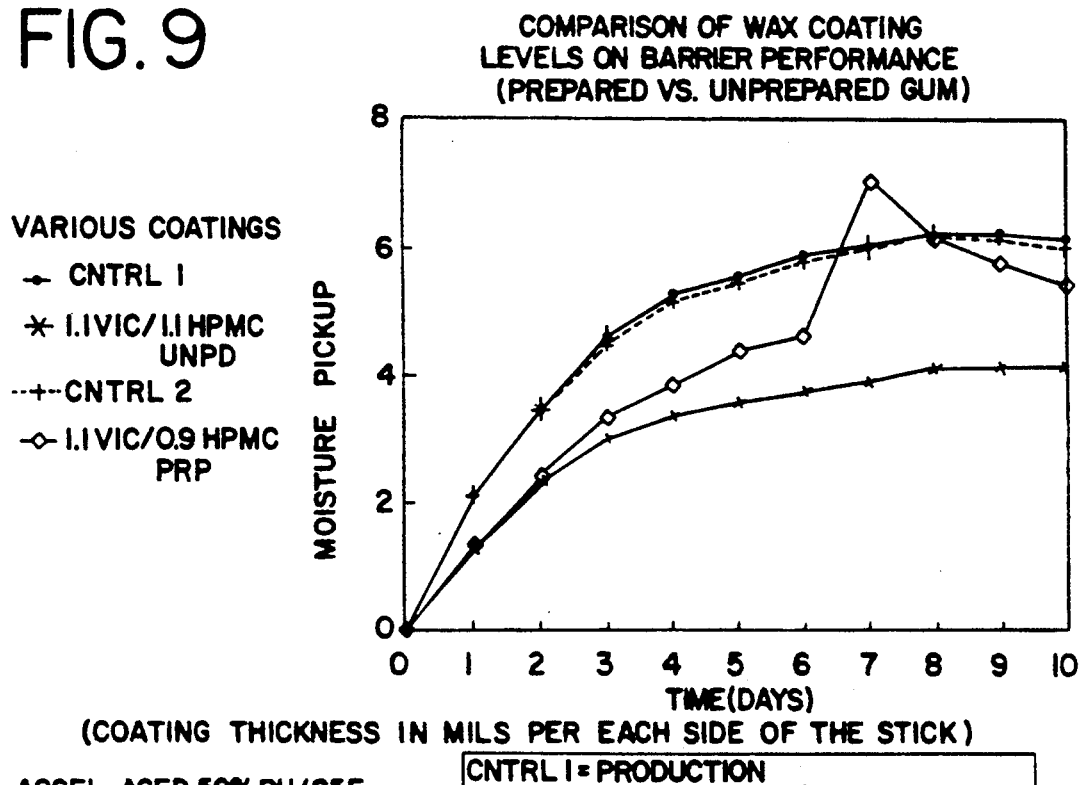
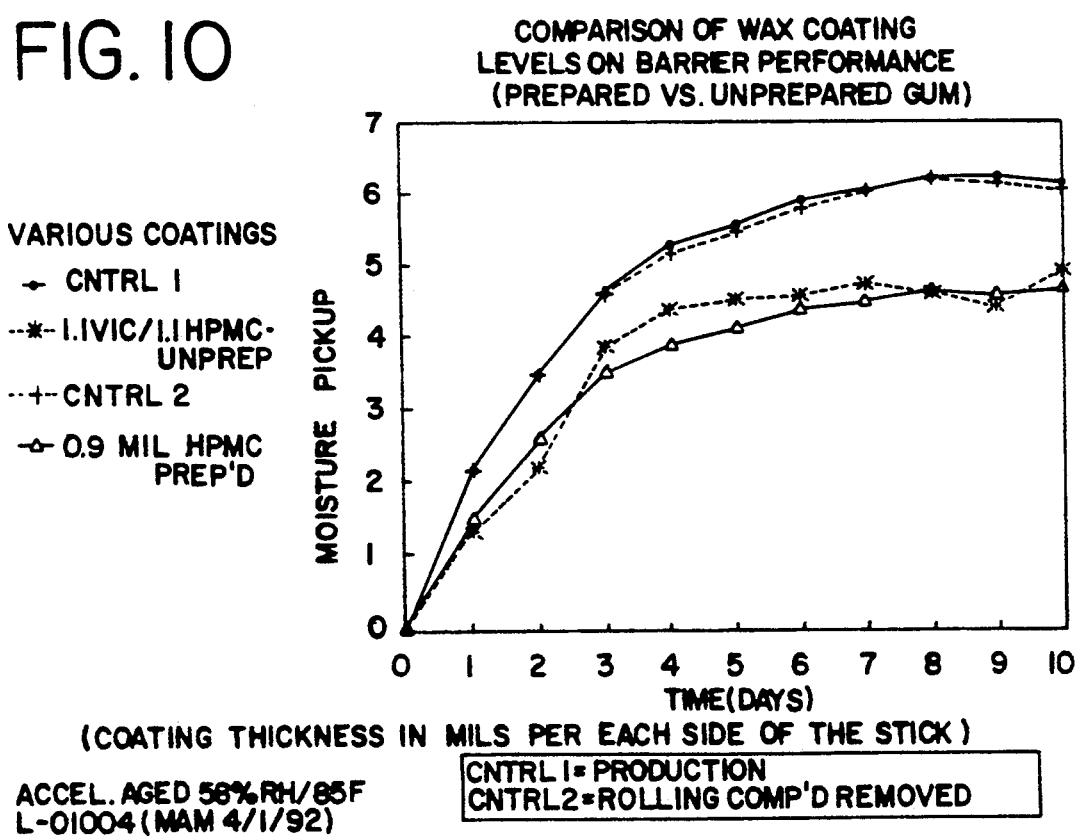

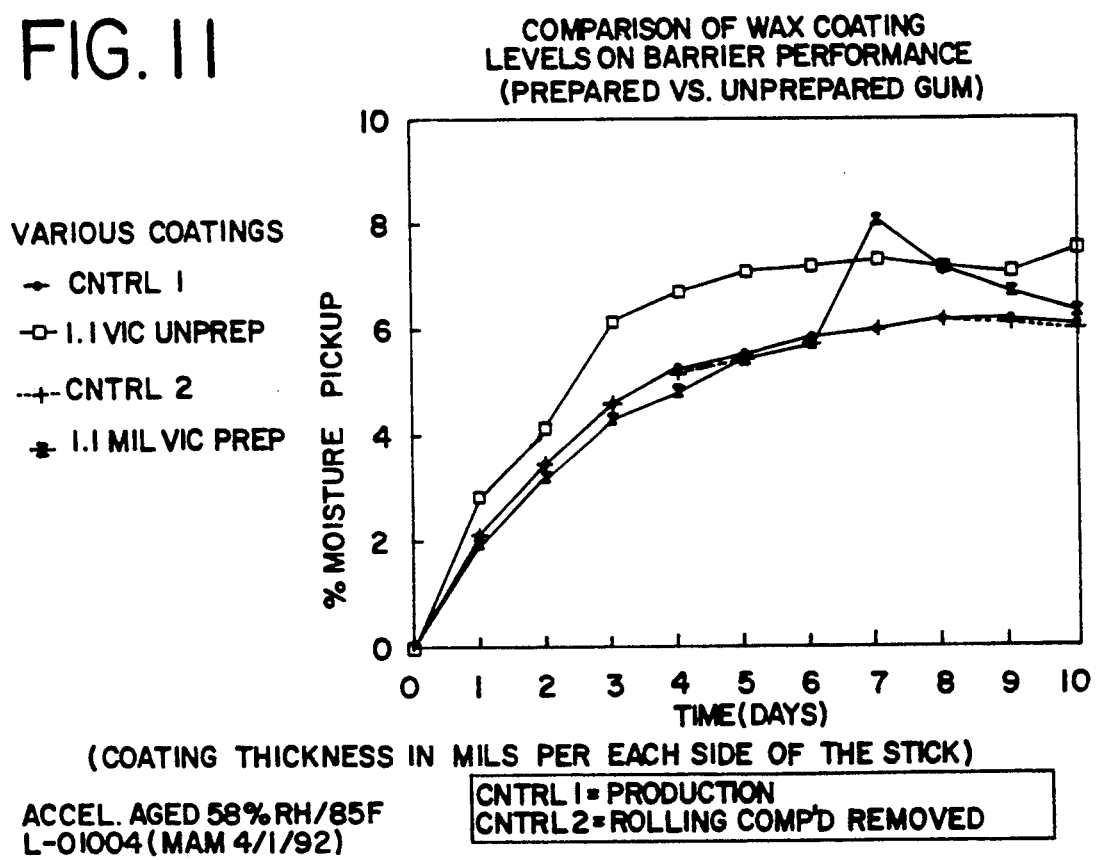

USE OF EDIBLE FILM TO PROLONG CHEWING GUM SHELF LIFE

FIELD OF THE INVENTION

This invention relates to the use of an edible film coating on a stick chewing gum which maintains a stable moisture content of the chewing gum by reducing the potential for both moisture loss and moisture absorption during storage.

BACKGROUND OF THE INVENTION

During storage, chewing gum has a tendency to lose or gain moisture from the surrounding atmosphere depending on the surrounding temperature, relative humidity, and packaging, and also depending on the shape and formulation of the chewing gum. Sugar-containing chewing gums, for instance, typically contain corn syrup and a small amount of humectant such as aqueous sorbitol or glycerin. Such sugar-containing chewing gums have a tendency to dry out and become brittle when stored under relatively dry conditions of 50% relative humidity and lower. The tendency of sugar gums to dry out and become brittle is particularly apparent at higher ambient temperatures.

Sugarless chewing gums are typically designed to contain lower amounts of moisture than sugar-containing gums. In sugarless gums which are sweetened with aspartame or other moisture-susceptible artificial sweeteners, it is important to maintain a low moisture content in order to prevent loss of sweetness and flavor qualities. However, due to their low initial moisture content, these sugarless gums tend to gain moisture at above 40% relative humidity, causing wetness of the chewing gum and degradation of the aspartame or other moisture-susceptible artificial ingredients.

Various technologies have been developed for the purpose of protecting chewing gum from moisture loss, moisture gain and other adverse changes which result from storage. For example, packaging techniques have been developed which provide sealed, high quality protective packaging for individual chewing gum sticks. One such technique is disclosed in U.S. Pat. No. 5,048,260 to Raymond et al.

Other techniques of protecting chewing gum from adverse environmental conditions have involved modifying the chewing gum formulae so as to encapsulate or otherwise protect the individual chewing gum ingredients which are environmentally susceptible. U.S. Pat. No. 4,822,622 to Dokuzovic et al. discloses the use of a protective barrier film through the center of a chewing gum to separate a flavor-containing chewing gum layer from an aspartame-containing chewing gum layer. The barrier film components which are disclosed include gelatin, acacia gum, agar, algin and derivatives, carrageenan and salts thereof, arabinogalactan, baker yeast, glycan, carboxymethylcellulose, carob bean gum, cellulose gum, furcellaran and salts thereof, guar gum, gum arabic, hydroxypropyl cellulose, hydroxypropyl methyl cellulose, Irish moss gelose, karaya gum, locust bean gum, methylcellulose, methylethyl cellulose, pectin, propylene glycol alginate, propylene glycol ether of methylcellulose, sodium carboxy methylcellulose, tragacanth gum, xanthan gum, shellac, and mixtures thereof.

U.S. Pat. No. 4,568,560 discloses a method for encapsulating active ingredients in a coating composition comprising a water soluble film forming composition, an enteric compound and a plasticizer for the film forming composition. U.S. Pat. No. 4,824,680 to Bernatz et al. discloses a method of producing a sugar-based chewing gum having improved wrappability.

Still other techniques of protecting chewing gum from adverse environmental conditions have involved coating the chewing gum with an edible film. Most of these techniques have focused on the film coating of chewing gum tablets and other confectionery tablets, as opposed to chewing gum sticks. U.S. Pat. No. 4,802,924 and PCT Publication WO 87/07902 disclose the coating of pharmaceutical tablets, foods, confectionery forms and the like with polydextrose, or a combination of polydextrose and cellulosic polymer, or a layer of polydextrose overcoated by a layer of cellulosic polymer. German Patent No. DE 3,043,914 discloses the coating of pharmaceuticals, confectionery products and foods, with an edible film containing methyl cellulose, hydroxypropyl methyl cellulose, hydroxypropyl cellulose, cellulose acetate phthalate, ethyl cellulose, polyvinyl pyrrolidone, sodium ethyl cellulose sulfate, corn protein (zein), and/or poly (vinyl acetate phthalate).

U.S. Pat. No. 4,810,534 to Seaborne et al. discloses a method for preparing a low water permeable, edible film containing cross-linked shellac and one or more edible sources of polyphenolics, benzaldahyde and derivatives, acetylated monoglycerides, polyglycerol esters, straight chain monocarboxylic acid and dicarboxylic acids. U.S. Pat. No. 4,777,046 to Iwakura et al. discloses a sheet-like preparation comprising a drug, a gelatin or agar, gluten, a carboxyvinyl polymer, a polyhydric alcohol, a gum, a wax and a sheet-like support. PCT Publications WO 87/03453 and WO 86/00501 both disclose methods of preparing preformed edible films which include a layer of a hydrophilic polymer selected from the group consisting of edible, film-forming carbohydrates and proteins, and a lipid layer adhered to the hydrophilic layer.

There is a need or desire in the chewing gum industry for a coating and coating method which is uniquely suited to the prevention of moisture absorption and moisture loss from stick chewing gum. Chewing gum sticks, due to their high ratios of surface area to volume, are susceptible to rapid changes in their moisture content when exposed to adverse environmental conditions. Also, stick gums are more difficult to uniformly coat then pellet gums due to their large surface areas.

SUMMARY OF THE INVENTION

The present invention is directed to a coating and coating method which are uniquely suitable for reducing moisture loss and/r moisture absorption by chewing gum sticks. A chewing gum stick is defined as a chewing gum product which is cut from a sheet of chewing gum as explained below. An aqueous solution of an edible, water soluble film forming agent, preferably a cellulose derivative, is applied to one surface of a chewing gum sheet, preferably before the sheet is scored or cut into individual chewing gum sticks. The coating is partially dried for a short period of time, preferably using forced air and low heat. The drying time should be long enough to allow the aqueous film forming agent to become sticky, so that it can no longer flow. The drying time should not be so long as to cause the film forming agent to become hard or brittle, or to lose its adhesive tackiness.

While the edible film forming agent is still tacky, a coating of wax is applied over the edible film forming agent. The wax is preferably applied in its molten state, but can be applied in the form of a powder and then pressed and melted. After the wax cools, the entire coating process is repeated for the opposite surface of the chewing gum sheet. Alternatively, both sides of the gum sheet can be coated simultaneously.

The chewing gum sheet is then scored, cut into sticks, and packaged. The eating of edible film forming agent reaches an equilibrium moisture content with the chewing gum composition, at which the edible film forming agent serves as a barrier to reduce moisture transmission from either side of the edible film forming agent, i.e., from he chewing gum to the atmosphere and from the atmosphere to the chewing gum. However, the edible film forming agent is itself hydrophilic, and can reduce its barrier properties if permitted to absorb an unlimited quantity of moisture from the atmosphere.

The wax layer serves to protect the edible film forming agent from exposure to the atmosphere and also helps protect the gum. By virtue of the wax layer, the edible film forming gent is prevented from absorbing excessive quantities of moisture from the atmosphere, and its barrier properties are preserved.

With the foregoing in mind, it is a feature and advantage of the invention to provide an improved coating and coating method which slow the rate of change of the moisture content in stick chewing gum, due to adverse conditions in the surrounding atmosphere.

It is also a feature nd advantage of the invention to provide an improved stick chewing gum and method of making stick chewing gum, which has an improved shelf life.

The foregoing and other features and advantages of the invention will become further apparent from the following detailed description of the presently preferred embodiments, when read in conjunction with the accompanying examples and figures. The detailed description, examples and figures are to be construed as illustrative rather than limitative, with the scope of the invention being defined by the appended claims and equivalents thereof.

BRIEF DESCRIPTION OF THE FIGURES

FIG. 9 shows the weight gain as a function of time for chewing gum sticks coated with HPMC and Victory wax after the rolling compound has been removed (prepared sample) compared with hewing gum sticks coated with HPMC and Victory wax without removing the rolling compound (unprepared sample.)

FIG. 10 shows the wight gain as a function of time for chewing gum sticks coated with HPMC only, after the rolling compound has been removed (prepared sample) and without removing the rolling compound (unprepared sample).

FIG. 11 shows the weight gain as a function of time for chewing gum sticks coated with Victory wax only, after the rolling compound has been removed (prepared sample) and without removing the rolling compound (unprepared sample).

DETAILED DESCRIPTION OF THE PRESENTLY PREFERRED EMBODIMENTS

Figure 1:
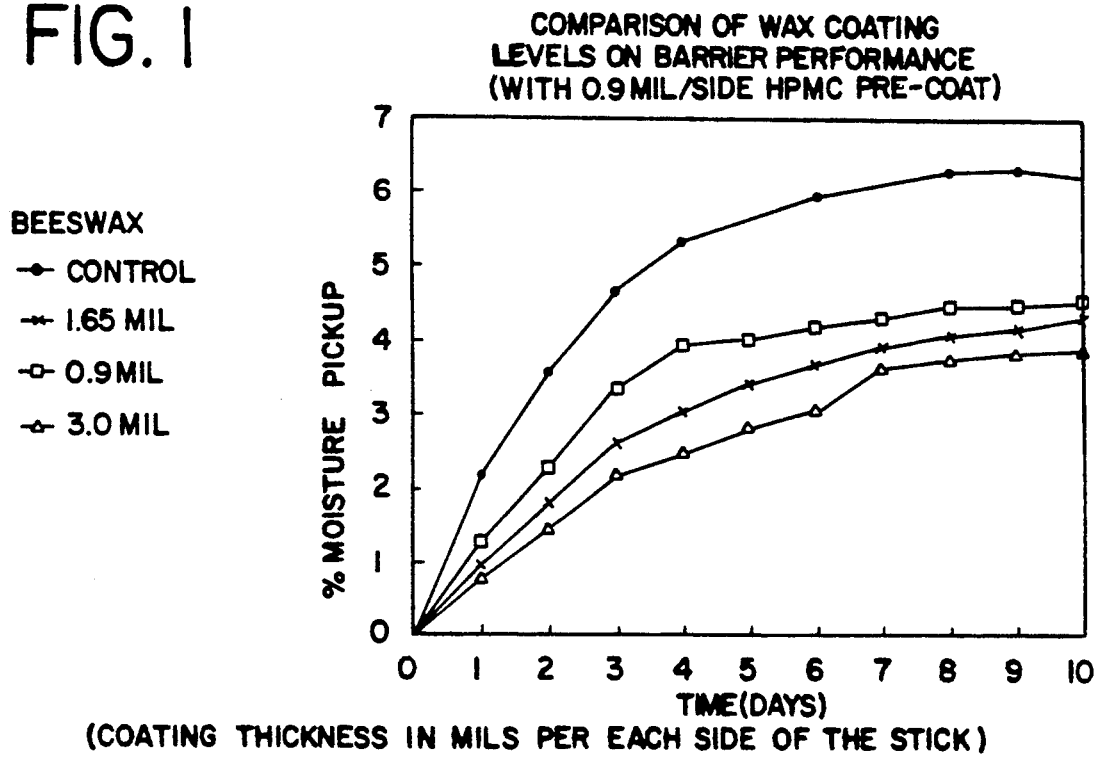
FIG. 1 shows the weight gain as a function of time for chewing gum sticks coated on both sides with 0.9 mils (wet) of aqueous hydroxypropyl methylcellulose (HPMC) and beesax, for different thicknesses of wax coating, at 58% relative humidity and 85° F.

In accordance with the invention, a chewing gum composition is provided which has been manufactured, rolled using a dusting or rolling compound, and sheeted according to procedures well known in the art. The chewing gum sheet is coated on one surface using an aqueous solution of an edible, water soluble film forming agent. The edible, water soluble film forming agents which are presently contemplated for use with the invention include cellulose derivatives, modified starch, dextrin, gelatin, zein and vegetable gums including guar gum, locust bean gum and carrageenan gum. However, it is expected that any edible water-soluble film forming agent which exhibits adhesive characteristics after being partially dried, can be used.

The preferred water soluble film forming agents are cellulose derivatives. These include ethyl cellulose, hydroxypropyl methyl cellulose, hydroxypropyl cellulose, carboxyethyl cellulose, methyl cellulose and sodium hydroxymethyl cellulose. Of these, the most preferred water soluble film forming agent is hydroxypropyl methyl cellulose (HPMC).

The water soluble film forming agent is used in an aqueous solution which includes about 5 to about 25 weight percent water soluble film forming agent. Preferably, the aqueous solution includes about 10 to about 20 weight percent water soluble film forming agent, most preferably about 13 weight percent. A commercially available food grade HPMC which is particularly suitable for use i the invention is Methocel E5 available from the Dow Chemical Co., Midland, Michigan. A plasticizer may be mixed with the HPMC in order to improve flexibility of the film.

The aqueous solution of film forming agent should be applied using spraying equipment which is capable of spraying a fine mist of the solution. An example of suitable spraying equipment is the Nordson Model 64B airless sprayer, available from Nordson Corp., Amherst, Ohio. During spraying, the spraying nozzle should be about 10 inches or slightly less above the chewing gum surface. A sufficient amount of the aqueous solution should be applied to give a wet coating thickness of about 0.25 to about 1.5 mils, preferably about 0.7 to about 1.2 mils, most preferably about 1.0 mils.

In some instances, it may be desirable to remove any rolling or dusting compound present on the surface of the chewing gum sheet, before applying the aqueous solution of edible film forming agent. Removal of the dusting compound is not always necessary or beneficial, but may be necessary in instances where the edible film forming agent is applied as a relatively thin coating, or is otherwise easy to crack during or after drying. Removal of much of the dusting compound can be accomplished by applying a dry cloth to the surface of the chewing gum sheet, followed by a damp cloth. During production, the rolling compound may alternatively be removed using a brush, vacuum, or other suitable technique.

After the aqueous solution of edible film forming agent has been applied, the solution is allowed to dry partially until the coating becomes tacky and can no longer flow. The coating should not be so dry that its adhesive properties are lost, or so wet that its adhesive properties are not apparent. The drying is preferably accomplished over a short period of time of about 30 seconds to about two minutes, depending on the wet thickness of the coating. Preferably, the drying is aided by the use of a forced air blower, using air that is heated to a temperature of no greater than about 120° F.

After the aqueous solution of edible film forming agent has been partially dried to a paste or glue, a layer of wax is applied over the edible film forming agent. The types of waxes which are suitable for use with the invention include natural waxes such as beeswax and carnauba wax; microcrystalline waxes such as Victory wax, Besquare wax and Star wax; and paraffin waxes. Of these, the preferred wax is beeswax.

The wax is preferably applied in the molten state in order to facilitate uniformity of application and adhesion, but can alternatively be applied as a powder and pressed. An example of equipment which is suitable for applying the wax is the Nordson Model 2302 hot melt wax spray applicator, equipped with an H20T spray gun with a cross-cut nozzle, available from the Nordson Corp., Amherst, Ohio. During spraying, the spraying nozzle should be about one inch above the chewing gum surface, in order to ensure that the wax remains molten until after contacting the previously applied coating of edible film forming agent. A sufficient amount of the wax should be applied to give a wax coating thickness of about 0.5 to about 3.0 mils, preferably about 0.7 to about 2.0 mils, most preferably about 1.0 mil. The thickness of the wax coating does not change significantly as the wax hardens to a solid.

After the wax has hardened, then the entire coating process is repeated on the opposite surface of the chewing gum sheet. Alternatively, both sides of the gum can be coated simultaneously. After both sides of the chewing gum sheet have been coated, the chewing gum can be scored, cut into sticks and wrapped. In an alternative embodiment, the chewing gum can be scored and cut into sticks before one or both surfaces have been coated.

A chewing gum composition generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into sticks. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1–11

General Procedure

The following chewing gum formulation was prepared for use in a variety of trials described hereinafter in the Examples:

| Component | Weight Percent |
|---|---|
| Gum Base | 24.4 |
| Sorbitol | 48.75 |
| Coevaporated blend of 67.5% Lycasin hydrogenated starch hydrolysate solids, 25% glycerin and 7.5% water | 9.1 |
| Mannitol | 8.0 |
| Glycerin | 7.7 |
| Peppermint Flavor | 1.6 |
| Encapsulated Aspartame | 0.2 |
| Brown Color Dispersion | 0.05 |
| 10% Salt Solution | 0.05 |
| Lecithin | 0.15 |
| TOTAL | 100.00 |

For purposes of the following Examples, the chewing gum was rolled using a mannitol rolling compound, sheeted, scored and cut into sticks. Then, the chewing gum sticks were coated according to the following general procedure. For some of the samples used in the following Examples, one or more steps of the procedure were omitted, as will become hereinafter apparent.

Procedure a. Remove the rolling compound from the chewing gum sticks by wiping with a dry cloth, followed by a damp cloth. Allow the chewing gum sticks to dry.
b. Flush a Nordson hot melt wax spray applicator for 10–15 minutes using the appropriate wax.
c. Apply a coating of Methocel E5 solution (13.3% HPMC in water) to one surface of the chewing gum stick, using a Nordson airless solution sprayer. Using an air dryer with low heat (about 120° F.), dry the aqueous HPMC coating partially until it becomes tacky, and will not flow. Drying time should generally be no longer than about 30 seconds to about two minutes.
d. Apply a coating of wax over the partially dried coating of Methocel E5. Allow the wax to harden.
e. Repeat steps "a" through "d" for the opposite surface of the chewing gum sticks.

After the chewing gum sticks were coated on both sides, the coated samples (unwrapped) were stored under controlled conditions of 58% relative humidity and 85° F., for several days. The samples were weighed periodically in order to calculate the percent weight change due to moisture pickup. The results were plotted in FIGS. 1–11. In order to facilitate a clear understanding of these graphs, the comparisons made in each of the Figures are discussed individually in the following Examples 1–11.

EXAMPLE 1

Referring to FIG. 1, chewing gum sticks on both sides with a 0.9 mil coating of 13.3% Methocel E5 solution (measured before any drying occurred) and with various thicknesses of beeswax. The sample designated as "control" consisted of sticks of the chewing gum without any coating of HPMC or wax, which were "unprepared" (i.e. without the rolling compound removed). The remaining samples were "prepared" (i.e. the rolling compound was removed), were coated with aqueous HPMC, and were coated with 0.9, 1.65 and 3.0 mils of beeswax, respectively. FIG. 1 indicates that the "control" chewing gum sample picked up more than six weight percent additional moisture from the surrounding atmosphere, over the 10-day storage period. The remaining samples, which exemplified the preferred embodiment of the invention (the most preferred edible film forming agent and the most preferred wax) showed at least a 30% reduction in moisture pickup, for the 10 days. The reduction in moisture pickup improved somewhat as the thickness of the beeswax increased.

EXAMPLE 2

Figure 2:
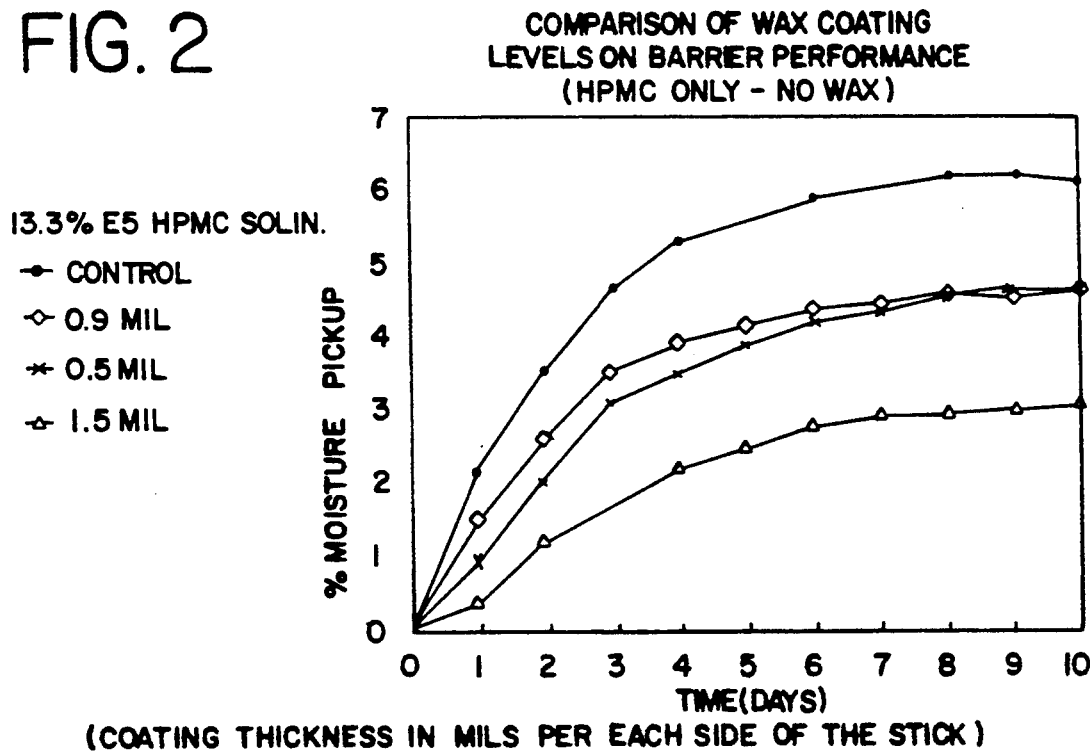
FIG. 2 shows the weight gain as a function of time for chewing gum sticks coated with different thicknesses (wet) of aqueous HPMC, and no wax.

Referring to FIG. 2, chewing gum sticks prepared by removing the rolling compound, and coated with various thicknesses of 13.3% Methocel E5 solution (measured before drying), but not coated with any wax, were compared to the unprepared, uncoated chewing gum control sticks. Coatings of 0.50 and 0.90 mil of Methocel E5 solution (measured before drying) resulted in about a 25% reduction in moisture pickup over the 10-day period, compared with the control. A coating of 1.50 mils of Methocel E5 solution caused further improvement, resulting in a reduction in moisture pickup of more than 50%, compared with the control.

EXAMPLE 3

Figure 3:
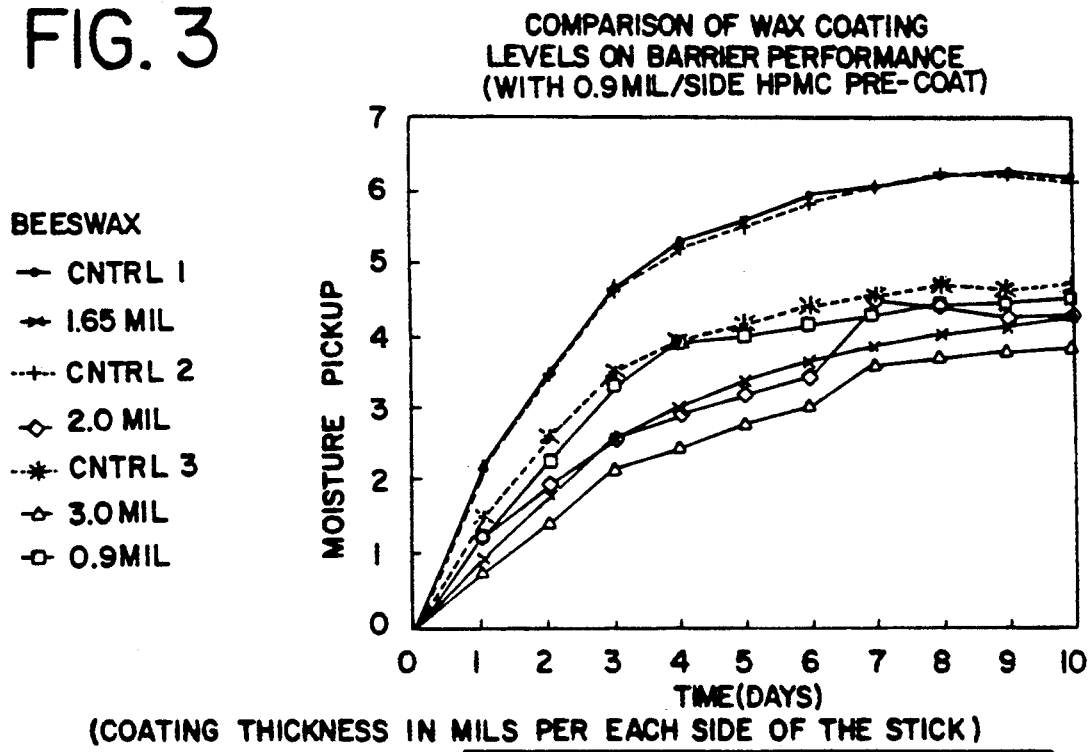
FIG. 3 shows the weight gain as a function of time for chewing gum sticks coated on both sides with 0.9 mils (wet) of aqueous HPMC and beeswax, for different thicknesses of beeswax and for no wax.

Referring to FIG. 3, the sample called "control 1" refers to the chewing gum sticks, which were uncoated and unprepared (i.e. with the rolling compound intact). The sample called "Control 2" refers to the uncoated chewing gum sticks, which were "prepared" by removing the rolling compound. The sample called "Control 3" refers to prepared chewing gum sticks, coated on both sides with 0.9 mil of 13.3% Methocel E5 solution (measured before drying) but not coated with any wax. The remaining samples consisted of prepared chewing gum sticks coated with 0.9 mil of Methocel E5 solution (measured before drying) and further coated with 0.9, 1.65, 2.0 and 3.0 mils, respectively, of beeswax.

Control 1 and Control 2 both picked up more than 6% by weight additional moisture in 10 days, indicating that removal of the rolling compound had no significant effect on moisture pick-up. Control 3 picked up about 4.7% by weight additional moisture, indicating significant improvement resulting from the coating with HPMC alone. The remaining samples showed further reduction of moisture pick-up resulting from coating with beeswax in addition to HPMC, with the reduction being more pronounced as the thickness of beeswax was increased.

EXAMPLE 4

Figure 4:
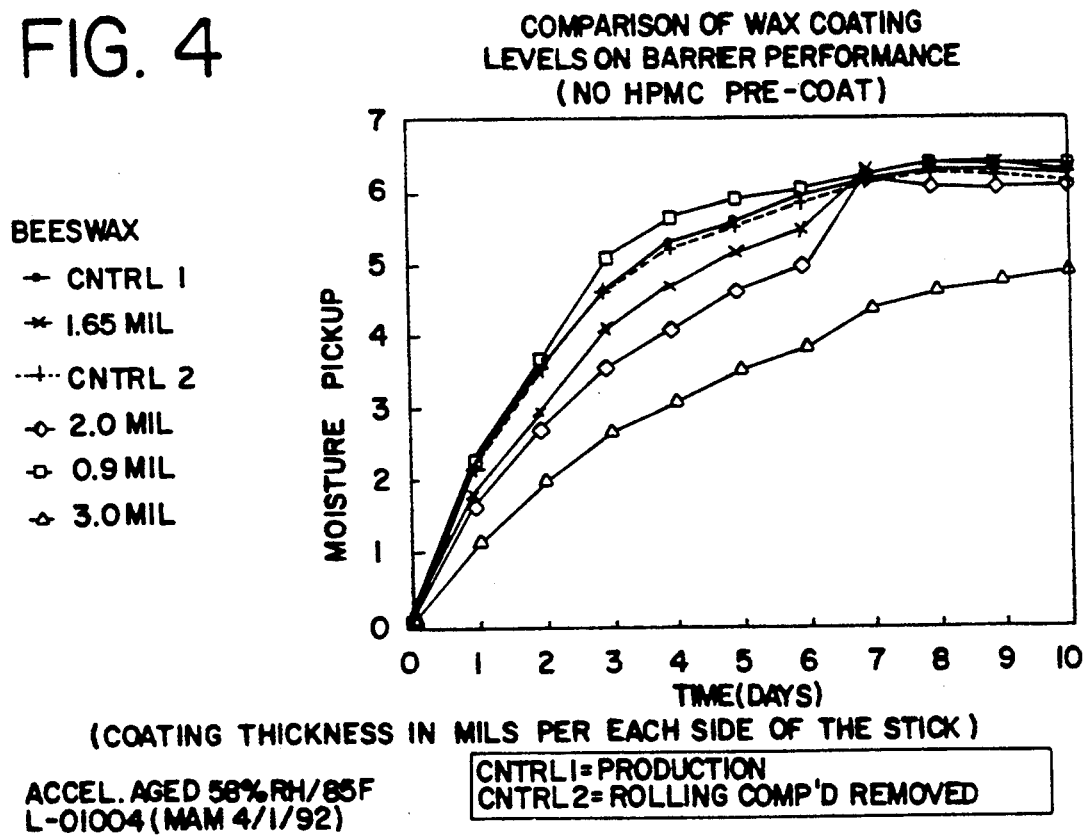
FIG. 4 shows the weight gain as a function of time for chewing gum sticks coated with different thicknesses of beeswax only, and no HPMC.

Referring to FIG. 4, the samples called "Control 1" and "Control 2" are the same as described above in Example 3. The remaining samples were prepared chewing gum sticks coated with 0.9, 1.65, 2.0 and 3.0 mils, respectively, of beeswax, but not coated with HPMC. While the beeswax alone caused some reduction in moisture pick-up, particularly at 3.0 mils, the reduction was much less than when the chewing gum sticks were coated with HPMC and beeswax. This can be seen by comparing FIG. 4 with FIG. 3.

EXAMPLE 5

Figure 5:
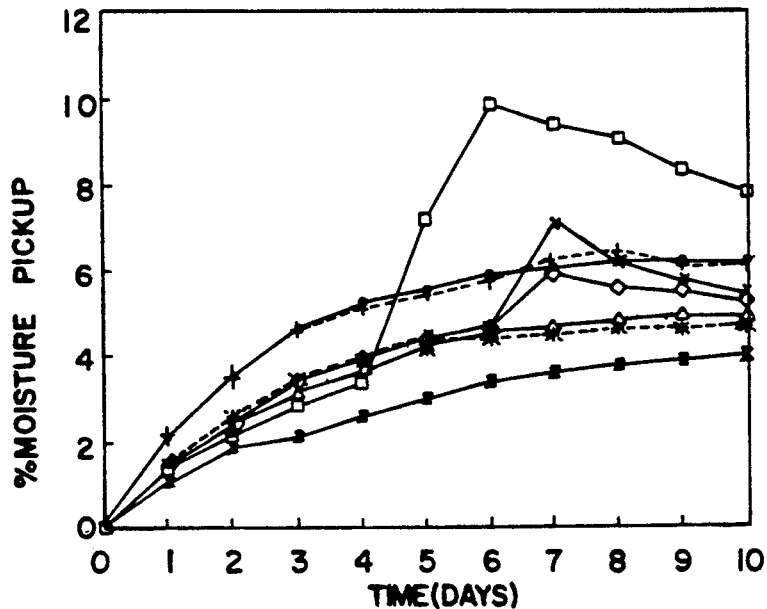
FIG. 5 shows the weight gain as a function of time for chewing gum sticks coated on both sides with 0.9 mils (wet) of aqueous HPMC and Victory (microcrystalline) wax, for different thicknesses of Victory wax and for no wax.

Referring to FIG. 5, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.45, 1.1, 1.65, 2.0 and 3.0 mils, respectively, of Victory wax. Victory wax is a synthetic microcrystalline wax available from the Petrolite Company in Tulsa, Oklahoma, and is softer than beeswax.

Comparison of the wax-coated samples with Controls 1 and 2 indicates that the samples with wax coatings of 1.1 mils and above (in addition to HPMC) showed reduced moisture pick-up after 10 days, compared with the uncoated chewing gum sticks. The sample with a wax coating of 0.45 mils did not show a consistent or overall improvement in moisture pick-up. Comparison of the wax-coated samples with Control 3 indicates that only the thickest of the wax coatings, 3.0 mils, showed further reduction in moisture pick-up compared with the chewing gum sticks coated with HPMC and no wax.

EXAMPLE 6

Figure 6:
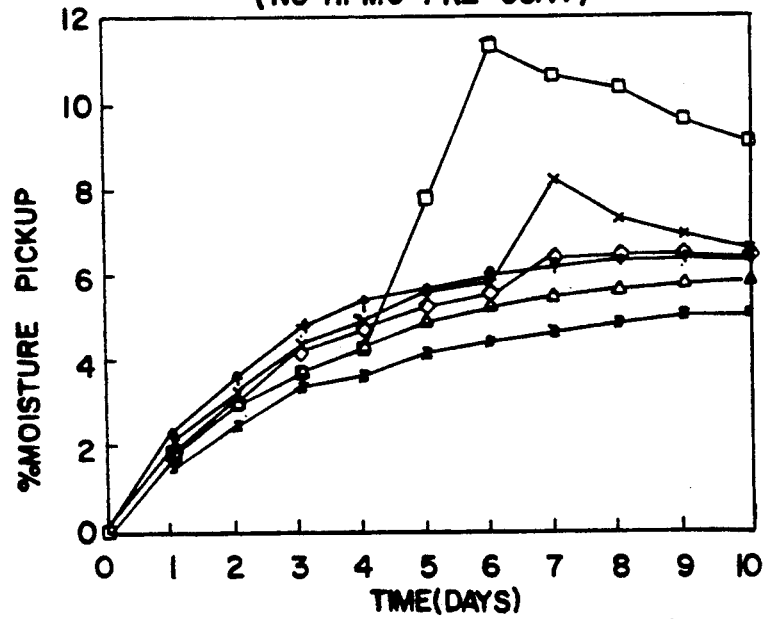
FIG. 6 shows the weight gain as a function of time for chewing gum sticks coated with different thicknesses of Victory wax only, and no HPMC.

Referring to FIG. 6, the samples called "Control 1" and "Control 2" are the same as described above in Example 3. The remaining samples were prepared chewing gum sticks coated with 0.45, 1.1, 1.65, 2.0 and 3.0 mils, respectively, of Victory wax, but not coated with HPMC. Only the thickest of wax coatings, 2.0 and 3.0 mils, showed consistent reductions in moisture pick-up compared to the uncoated chewing gum controls.

EXAMPLE 7

Figure 7:
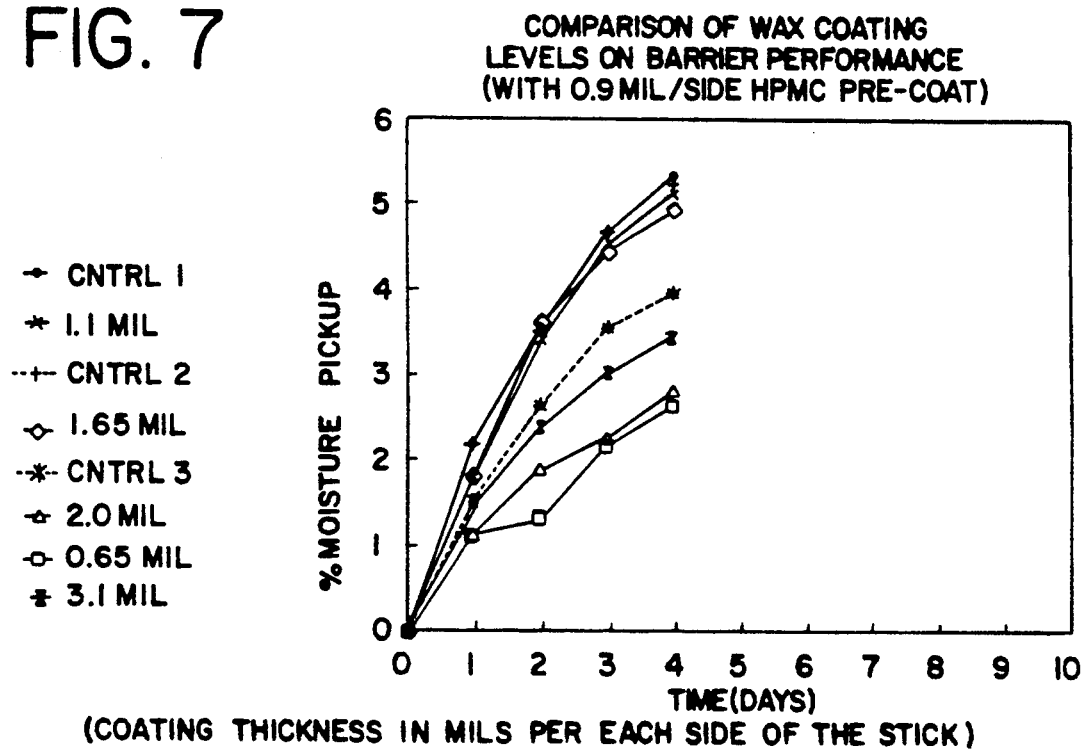
FIG. 7 shows the weight gain as a function of time for chewing gum sticks coated on both sides with 0.9 mils (wet) of aqueous HMC and Besquare 185 (microcrystalline) wax, for different thicknesses of Besquare 185 wax and for no wax

Referring to FIG. 7, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.65, 1.1, 1.65, 2.1 and 3.1 mils, respectively, of Besquare 185 wax. Besquare 185 is a synthetic microcrystalline wax available from the Petrolite Co. in Tulsa, Oklahoma. Besquare 185 is harder and more crystalline than Victory wax and has a less branched, more linear molecular structure.

Comparison of the wax-coated samples with Controls 1 and 2 indicates that, in general, the samples with wax coatings in addition to HPMC showed, reduced moisture pick-up after four days, compared with the uncoated chewing gum sticks.

EXAMPLE 8

Figure 8:
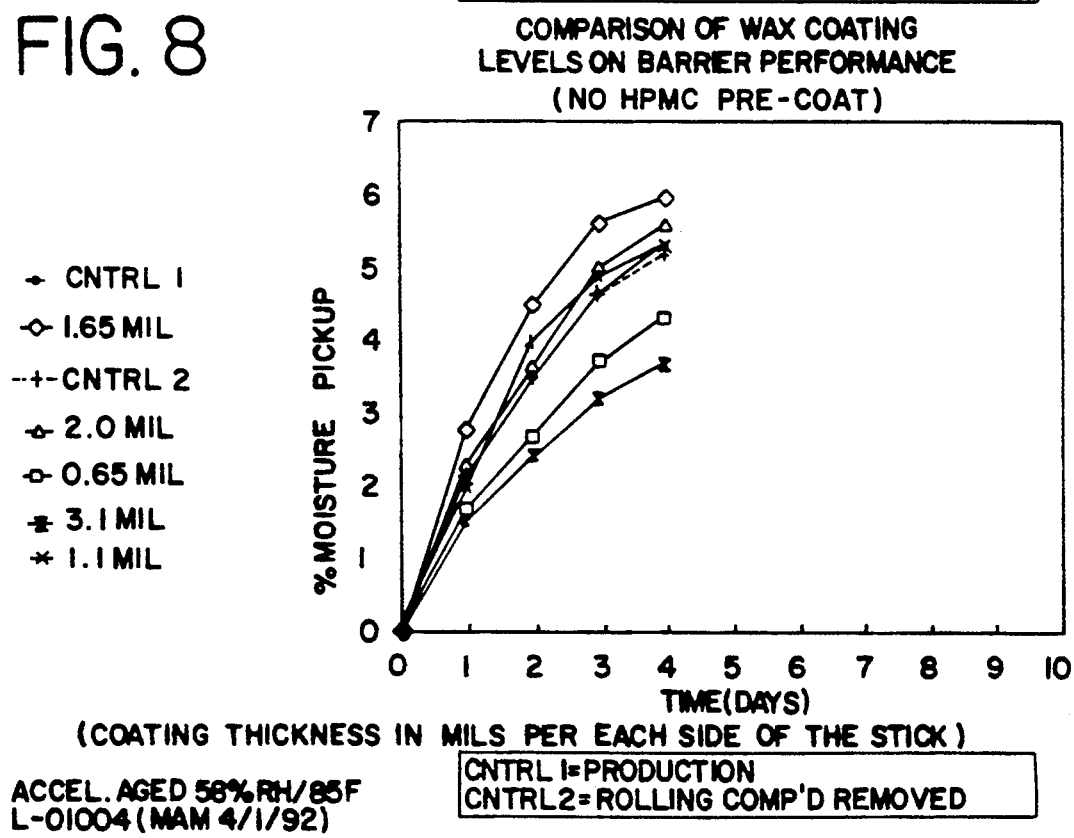
FIG. 8 shows the weight gain as a function of time for chewing gum sticks coated with different thicknesses of Besquare 185 wax only, and no HPMC.

Referring to FIG. 8, the samples called "Control 1" and "Control 2" are the same as described above in Example 3. The remaining samples were prepared chewing gum sticks coated with 0.65, 1.1, 1.65, 2.1 and 3.1 mils, respectively, of Besquare 185 wax, but not coated with HPMC.

Some of the wax-coated samples showed reduced moisture pick-up compared with the uncoated chewing gum sticks, while others did not. There was no recognizable correlation between the thickness of the wax coating and the amount of moisture pick-up, possibly due to cracking of the relatively hard wax.

EXAMPLE 9

Referring to FIG. 9, the samples called "Control 1" and "Control 2" are the same as described above in Example 3. One of the remaining samples consisted of prepared chewing gum sticks coated with 0.9 mils of 13.3% Methocel E5 solution (measured before drying) and 1.1 mils of Victory wax. The other of the remaining samples consisted of unprepared chewing gum sticks coated with 1.1 mils of Methocel E5 solution and 1.1 mils of Victory wax.

From the data, it cannot be said that the prepared chewing gum sticks coated with HPMC and wax, absorbed less additional moisture than the unprepared chewing gum sticks, coated with HPMC and wax. Both coated samples showed reduced moisture pick-up compared to the uncoated chewing gums sticks.

EXAMPLE 10

Referring to FIG. 10, the samples called "Control 1" and "Control 2" are the same as described above in Example 3. One of the remaining samples consisted of prepared chewing gum sticks coated with 0.9 mils of 13.3% Methocel E5 solution (measured before drying) but not coated with wax. The other of the remaining samples consisted of unprepared chewing gum sticks coated with 1.1 mils of Methocel E5 solution, but not coated with wax.

Again, whether or not the dusting compound was removed prior to coating, made no difference in the performance of the samples coated with HPMC. Both coated samples showed reduced moisture pick-up compared to the uncoated chewing gum sticks.

EXAMPLE 11

Referring to FIG. 11, the samples called "Control 1" and "Control 2" are the same as described above in Example 3. The remaining samples consist of prepared and unprepared chewing gum sticks coated with 1.1 mils of Victory wax but no HPMC.

Neither of the samples coated with Victory wax, but not HPMC, showed a reduction in moisture pick-up compared to the uncoated chewing gum sticks.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A method of preparing coated chewing gum sticks with improved shelf life, comprising the steps of:
   preparing a chewing gum composition including about 5-95% by weight of a water soluble bulk portion, about 5-95% by weight of a water insoluble chewing gum base portion, and about 0.1-15% by weight of one or more flavoring agents;
   rolling the chewing gum composition using a dusting compound, and forming the chewing gum composition into a sheet having first and second sides;
   applying a coating of an aqueous solution of an edible, water soluble film forming agent to the first side of the sheet;
   partially drying the coating of edible, water soluble film forming agent on the first side of the sheet at a temperature not exceeding about 120° F., until the film forming agent becomes tacky;
   applying a coating of wax over the tacky coating of edible, water soluble film forming agent on the first side of the sheet;
   applying a coating of aqueous solution of edible, water soluble film forming agent to the second side of the sheet;
   partially drying the coating of edible, water soluble film forming agent on the second side of the sheet at a temperature not exceeding about 120° F., until the film forming agent becomes tacky;
   applying a coating of wax over the tacky coating of edible, water soluble film forming agent on the second side of the sheet; and
   cutting the sheet into chewing gum sticks.

2. The method of claim 1, further comprising the steps of removing the dusting compound from the first side of the sheet before applying the aqueous solution of edible, water soluble film forming agent to the first side of the sheet, and removing the dusting compound from the second side of the sheet before applying the aqueous solution of edible, water soluble film forming agent to the second side of the sheet.

3. The method of claim 1, wherein the aqueous solution of edible, water soluble film forming agent is applied by spraying.

4. The method of claim 1, wherein the aqueous solution of edible, water soluble film forming agent comprises about 5 to about 25 weight percent film forming agent and about 75 to about 95 weight percent water.

5. The method of claim 1, wherein the aqueous solution of edible, water soluble film forming agent comprises about 10 to about 20 weigh percent film forming agent and about 80 to about 90 weight percent water.

6. The water of claim 1, wherein the aqueous solution of edible, water soluble film forming agent comprises about 13 percent film forming agent and about 87 weight percent water.

7. The method of claim 1, wherein the edible, water soluble film forming agent is selected from the group consisting of cellulose derivatives, modified starch, dextrin, gelatin, zein, vegetable gums, and combinations thereof.

8. The method of claim 1, wherein the edible, water soluble film forming agent comprises a cellulose derivative selected from the group consisting of ethyl cellulose, hydroxypropyl methyl cellulose, hydroxypropyl cellulose, carboxymethyl cellulose, methyl cellulose, sodium hydroxymethyl cellulose, and combinations thereof.

9. The method of claim 1, wherein the edible, water soluble film forming agent comprises hydroxypropyl methyl cellulose.

10. The method of claim 1, wherein the aqueous solution of edible, water soluble film forming agent is applied at a wet coating thickness of about 0.25 to about 1.5 mils.

11. The method of claim 1, wherein the aqueous solution of edible, water soluble film forming agent is applied at a wet coating thickness of about 0.7 to about 1.2 mils.

12. The method of claim 1, wherein the aqueous solution of edible, water soluble film forming agent is applied at a wet coating thickness of about 1.0 mils.

13. The method of claim 1, wherein the wax is applied in the molten state by spraying.

14. The method of claim 1, wherein the wax is applied as a powder and is then pressed and melted.

15. The method of claim 1, wherein the wax is selected from the group consisting of beeswax, carnauba wax, microcrystalline waxers, paraffin wax and combinations thereof.

16. The method of claim 1, wherein the wax comprises beeswax.

17. The method of claim 1, wherein the wax is applied to a coating thickness of about 0.5 to about 3.0 mils.

18. The method of claim 1, wherein the wax is applied to a coating thickness of about 0.7 to about 2.0 mils.

19. The method of claim 1, wherein the wax is applied to a coating thickness of about 1.0 mil.

20. A coated chewing gum stick prepared according to the method of claim 1.

21. A method of coating chewing gum sticks, comprising the steps of:
   applying a solution of an edible film forming agent selected from the group consisting of cellulose derivatives, modified starch, dextrin, gelatin, zein, vegetable gums, and combinations thereof, to a first surface of a chewing gum stick;
   partially drying the solution of edible film forming agent on the first surface at a temperature not exceeding about 120° F. until the edible film forming agent becomes tacky;

applying a wax selected from the group consisting of beeswax, carnauba wax, microcrystalline waxes, paraffin wax, and combinations thereof, over the tacky edible film forming agent on the first surface of the chewing gum stick;

applying a solution of an edible film forming agent selected from the group consisting of cellulose derivatives, modified starch, dextrin, gelatin, zein, vegetable gums, and combinations thereof, to a second surface of the chewing gum stick;

partially drying the solution of edible film forming agent on the second surface at a temperature not exceeding about 120° F. until the edible film forming agent becomes tacky; and applying a wax selected from the group consisting of beeswax, carnauba wax, microcrystalline waxes, paraffin wax, and combinations thereof, over the tacky edible film forming agent on the second surface of the chewing gum stick.

22. The method of claim 21, wherein the edible film forming agent comprises hydroxypropyl methyl cellulose.

23. The method of claim 21, wherein the wax comprises beeswax.

24. A coated chewing gum stick prepared according to the method of claim 21.

25. A chewing gum stick, comprising:

a chewing gum composition including about 5–95% by weight of a water soluble bulk portion, about 5–95% by weight of a water insoluble chewing gum base portion and about 0.1–15% by weight of one or more flavoring agents, formed into a stick having first and second surfaces;

an edible film layer covering each of the first and second surfaces, the edible film comprising a water-soluble film forming agent selected from the group consisting of cellulose derivatives, modified starch, dextrin, gelatin, zein, vegetable gums, and combinations thereof; and a wax layer covering each of the edible film layers on the first and second surfaces, the wax layer comprising a wax selected from the group consisting of beeswax, carnauba wax, microcrystalline waxes, paraffin wax, and combinations thereof.

26. The chewing gum stick of claim 25, wherein the water soluble film forming agent comprises a cellulose derivative selected from the group consisting of ethyl cellulose, hydroxypropyl methyl cellulose, methyl cellulose, sodium hydroxymethyl cellulose, and combinations thereof.

27. The chewing gum stick of claim 25, wherein the water soluble film forming agent comprises hydroxypropyl methyl cellulose.

28. The chewing gum stick of claim 25, wherein the wax comprises beeswax.

* * * * *

UNITED STATES PATENT AND TRADEMARK OFFICE
CERTIFICATE OF CORRECTION

PATENT NO. : 5,286,502
DATED : February 15, 1994
INVENTOR(S) : Marc A. Meyers

Page 1 of 3

It is certified that error appears in the above-indentified patent and that said Letters Patent is hereby corrected as shown below:

In column 2, line 47, delete "then" and substitute therefor --than--.

In column 2, line 54, delete "and/ r" and substitute therefor --and/or--.

In column 3, line 10, delete "eating" and substitute therefor --coating--.

In column 3, line 15, delete "he" and substitute therefor --the--.

In column 3, line 23, delete "gent" and substitute therefor --agent--

In column 3, line 31, delete "nd" and substitute therefor --and--.

In column 3, line 49, delete "beesax" and substitute therefor --beeswax--.

In column 4, line 3, delete "HMC" and substitute therefor --HPMC--.

UNITED STATES PATENT AND TRADEMARK OFFICE
CERTIFICATE OF CORRECTION

PATENT NO. : 5,286,502
DATED : February 15, 1994
INVENTOR(S) : Marc A. Meyers

It is certified that error appears in the above-indentified patent and that said Letters Patent is hereby corrected as shown below:

In column 4, line 12, delete "hewing" and substitute therefor --chewing--.

In column 4, line 15, delete "wight" and substitute therefor --weight--.

In column 4, line 45, delete "carboxyethyl" and substitute therefor --carboxymethyl--.

In column 4, line 56, after "use" delete "i" and substitute therefor --in--.

In column 6, line 34, after "thereof" insert --.--.

In column 8, line 39, after "sticks" insert --were coated--.

In column 8, line 49, delete "FIG. 1 indicates that the".

In column 8, line 50, before "'control'" begin a new paragraph by inserting --FIG. 1 indicates that the--.

In column 10, line 26, after "showed" delete ",".

In column 10, line 59, delete "gums" and substitute therefor --gum--.

UNITED STATES PATENT AND TRADEMARK OFFICE
CERTIFICATE OF CORRECTION

PATENT NO. : 5,286,502
DATED : February 15, 1994
INVENTOR(S) : Marc A. Meyers

It is certified that error appears in the above-indentified patent and that said Letters Patent is hereby corrected as shown below:

Column 12, Claim 5, line 3, delete "weigh" and substitute therefor --weight--.
Column 12, Claim 6, line 1, delete "water" and substitute therefor --method--.
Column 12, Claim 15, line 3, delete "waxers" and substitute therefor --waxes--.
Column 14, Claim 26, line 4, before the last occurrence of "methyl" insert --hydroxypropyl cellulose, carboxymethyl cellulose--.

Signed and Sealed this

Twenty-second Day of November, 1994

Attest:

BRUCE LEHMAN

*Attesting Officer*  *Commissioner of Patents and Trademarks*